(12) United States Patent
Czaplicki et al.

(10) Patent No.: US 7,125,461 B2
(45) Date of Patent: Oct. 24, 2006

(54) ACTIVATABLE MATERIAL FOR SEALING, BAFFLING OR REINFORCING AND METHOD OF FORMING SAME

(75) Inventors: Michael J. Czaplicki, Rochester, MI (US); Christopher Hable, Romeo, MI (US); David Carlson, Rochester Hills, MI (US)

(73) Assignee: L & L Products, Inc., Romeo, MI (US)

( * ) Notice: Subject to any disclaimer, the term of this patent is extended or adjusted under 35 U.S.C. 154(b) by 320 days.

(21) Appl. No.: 10/430,993

(22) Filed: May 7, 2003

(65) Prior Publication Data

US 2004/0221953 A1 Nov. 11, 2004

(51) Int. Cl.
*B29C 65/48* (2006.01)

(52) U.S. Cl. .................. 156/79; 156/244.22; 156/283; 156/289; 156/293; 156/294; 156/330

(58) Field of Classification Search ................ 156/79, 156/244.22, 293, 294, 330, 283, 289; 296/205
See application file for complete search history.

(56) References Cited

U.S. PATENT DOCUMENTS

| | | | |
|---|---|---|---|
| 4,427,481 A | 1/1984 | Smith et al. | |
| 4,538,380 A | 9/1985 | Colliander | |
| 4,601,469 A | 7/1986 | DeHoff | |
| 4,693,775 A | 9/1987 | Harrison et al. | |
| 4,695,343 A * | 9/1987 | Wycech | 156/196 |
| 4,724,243 A | 2/1988 | Harrison | |
| 4,749,434 A | 6/1988 | Harrison | |
| 4,769,166 A | 9/1988 | Harrison | |
| 4,778,845 A | 10/1988 | Tschan et al. | |
| 4,871,590 A | 10/1989 | Merz et al. | |
| 4,898,630 A | 2/1990 | Kitoh et al. | |
| 4,908,273 A | 3/1990 | Urech et al. | |
| 4,922,596 A | 5/1990 | Wycech | |
| 4,923,902 A | 5/1990 | Wycech | |
| 4,978,562 A | 12/1990 | Wycech | |
| 4,995,545 A | 2/1991 | Wycech | |
| 5,045,141 A * | 9/1991 | Salensky et al. | 156/330 |
| 5,124,186 A | 6/1992 | Wycech | |
| 5,266,133 A | 11/1993 | Hanley et al. | |
| 5,274,006 A | 12/1993 | Kagoshima et al. | |
| 5,275,853 A | 1/1994 | Silvis et al. | |
| 5,342,873 A | 8/1994 | Merz et al. | |
| 5,358,397 A | 10/1994 | Ligon et al. | |
| 5,382,606 A | 1/1995 | Butikofer | |
| 5,464,924 A | 11/1995 | Silvis et al. | |
| 5,470,886 A | 11/1995 | Makhlouf et al. | |
| 5,475,039 A | 12/1995 | Butikofer | |

(Continued)

FOREIGN PATENT DOCUMENTS

DE 199 19 783 A1 11/2000

(Continued)

OTHER PUBLICATIONS

Plastics Technology, "Keeping-Up with Materials, Newest Barrier Resin Is Thermoplastic Epoxy", Jan. 2000.*

(Continued)

*Primary Examiner*—Steven D. Maki
(74) *Attorney, Agent, or Firm*—Dobrusin & Thennisch PC (57) ABSTRACT

An activatable material and articles incorporating the same is disclosed. The activatable material includes at least three of an epoxy resin; a thermoplastic polyether; a blowing agent; a curing agent; and a filler. The activatable material is preferably used for sealing, baffling or reinforcing an article of manufacture such as an automotive vehicle.

27 Claims, 4 Drawing Sheets

U.S. PATENT DOCUMENTS

| | | | |
|---|---|---|---|
| 5,648,401 A | 7/1997 | Czaplicki et al. | |
| 5,712,317 A | 1/1998 | Makhlouf et al. | |
| 5,783,272 A | 7/1998 | Wong | |
| 5,884,960 A | 3/1999 | Wycech | |
| 5,894,071 A | 4/1999 | Merz et al. | |
| 5,932,680 A | 8/1999 | Heider | |
| 5,948,508 A | 9/1999 | Pastore et al. | |
| 5,962,093 A | 10/1999 | White et al. | |
| 5,964,979 A | 10/1999 | George et al. | |
| 5,985,435 A | 11/1999 | Czaplicki et al. | |
| 5,994,422 A | 11/1999 | Born et al. | |
| 6,004,425 A | 12/1999 | Born et al. | |
| 6,030,701 A | 2/2000 | Johnson et al. | |
| 6,040,350 A | 3/2000 | Fukui | |
| 6,057,382 A | 5/2000 | Karim et al. | |
| 6,077,884 A | 6/2000 | Hess et al. | |
| 6,096,791 A | 8/2000 | Born et al. | |
| 6,103,784 A | 8/2000 | Hilborn et al. | |
| 6,133,335 A | 10/2000 | Mahoney et al. | |
| 6,136,398 A | 10/2000 | Willett et al. | |
| 6,136,944 A | 10/2000 | Stewart et al. | |
| 6,153,302 A | 11/2000 | Karim et al. | |
| 6,162,504 A | 12/2000 | Hubert et al. | |
| 6,174,932 B1 | 1/2001 | Pachl et al. | |
| 6,218,442 B1 | 4/2001 | Hilborn et al. | |
| 6,228,449 B1 | 5/2001 | Meyer | |
| 6,232,433 B1 | 5/2001 | Narayan | |
| 6,235,842 B1 | 5/2001 | Kuwano et al. | |
| 6,263,635 B1 | 7/2001 | Czaplicki | |
| 6,277,898 B1 | 8/2001 | Pachl et al. | |
| 6,287,669 B1 | 9/2001 | George et al. | |
| 6,296,298 B1 | 10/2001 | Barz | |
| 6,303,672 B1 | 10/2001 | Papalos et al. | |
| 6,311,452 B1 | 11/2001 | Barz et al. | |
| 6,312,668 B1 | 11/2001 | Mitra et al. | |
| 6,319,964 B1 | 11/2001 | Blank et al. | |
| 6,348,513 B1 | 2/2002 | Hilborn et al. | |
| 6,350,791 B1 | 2/2002 | Feichtmeier et al. | |
| 6,358,584 B1 | 3/2002 | Czaplicki | |
| 6,376,564 B1 | 4/2002 | Harrison | |
| 6,403,222 B1 | 6/2002 | Harrison | |
| 6,419,305 B1 | 7/2002 | Larsen | |
| 6,429,244 B1 | 8/2002 | Rinka et al. | |
| 6,431,549 B1* | 8/2002 | Hill et al. | 156/91 |
| 6,432,475 B1 | 8/2002 | Yamamoto et al. | |
| 6,437,055 B1 | 8/2002 | Moriarity et al. | |
| 6,440,257 B1 | 8/2002 | Zhou et al. | |
| 6,441,075 B1 | 8/2002 | Hirata et al. | |
| 6,441,081 B1 | 8/2002 | Sadatoshi et al. | |
| H2047 H | 9/2002 | Harrison et al. | |
| 6,444,149 B1 | 9/2002 | Valentinsson | |
| 6,444,713 B1 | 9/2002 | Pachl et al. | |
| 6,448,338 B1 | 9/2002 | Born et al. | |
| 6,451,231 B1 | 9/2002 | Harrison et al. | |
| 6,451,876 B1 | 9/2002 | Koshy | |
| 6,455,116 B1* | 9/2002 | Xia et al. | 428/36.6 |
| 6,455,146 B1 | 9/2002 | Fitzgerald | |
| 6,455,476 B1 | 9/2002 | Imai et al. | |
| 6,467,834 B1 | 10/2002 | Barz et al. | |
| 6,471,285 B1 | 10/2002 | Czaplicki et al. | |
| 6,474,723 B1 | 11/2002 | Czaplicki et al. | |
| 6,479,560 B1 | 11/2002 | Freitag et al. | |
| 6,482,486 B1 | 11/2002 | Czaplicki et al. | |
| 6,486,256 B1 | 11/2002 | Tarbutton et al. | |
| 6,506,494 B1 | 1/2003 | Brandys et al. | |
| 6,528,546 B1* | 3/2003 | Lee et al. | 521/48 |
| 6,548,593 B1 | 4/2003 | Merz et al. | |
| 6,561,571 B1 | 5/2003 | Brennecke | |
| 6,573,309 B1 | 6/2003 | Reitenbach et al. | |
| 6,607,831 B1 | 8/2003 | Ho et al. | |
| 6,617,366 B1 | 9/2003 | Sueda et al. | |
| 6,620,501 B1 | 9/2003 | Kassa et al. | |
| 6,634,698 B1 | 10/2003 | Kleino | |
| 6,668,457 B1 | 12/2003 | Czaplicki | |
| 6,682,818 B1 | 1/2004 | Czaplicki et al. | |
| 6,706,772 B1 | 3/2004 | Czaplicki et al. | |
| 6,730,713 B1 | 5/2004 | Czaplicki | |
| 6,740,379 B1 | 5/2004 | Congard | |
| 6,740,399 B1 | 5/2004 | George et al. | |
| 6,753,379 B1 | 6/2004 | Kawate et al. | |
| 6,774,171 B1 | 8/2004 | Kassa | |
| 6,776,869 B1 | 8/2004 | Schenkel | |
| 6,777,079 B1 | 8/2004 | Zhou et al. | |
| 6,787,065 B1 | 9/2004 | Schapira et al. | |
| 6,787,579 B1 | 9/2004 | Czaplicki et al. | |
| 6,787,593 B1 | 9/2004 | Bell et al. | |
| 6,787,605 B1 | 9/2004 | Clough et al. | |
| 6,787,606 B1 | 9/2004 | Chen | |
| 6,790,597 B1 | 9/2004 | Dershem et al. | |
| 6,790,906 B1 | 9/2004 | Chaignon et al. | |
| 6,797,371 B1 | 9/2004 | Gehlsen et al. | |
| 6,800,157 B1 | 10/2004 | Tarbutton et al. | |
| 6,800,680 B1 | 10/2004 | Stark et al. | |
| 6,805,768 B1 | 10/2004 | Agarwal et al. | |
| 6,806,320 B1 | 10/2004 | Everaerts et al. | |
| 6,811,864 B1 | 11/2004 | Czaplicki et al. | |
| 6,838,509 B1 | 1/2005 | Shimo et al. | |
| 6,846,559 B1 | 1/2005 | Czaplicki et al. | |
| 6,884,854 B1 | 4/2005 | Schoenfeld et al. | |
| 6,887,914 B1 | 5/2005 | Czaplicki et al. | |
| 6,890,964 B1 | 5/2005 | Czaplicki et al. | |
| 6,894,082 B1 | 5/2005 | Brantl et al. | |
| 6,911,109 B1 | 6/2005 | Giroux et al. | |
| 2002/0009582 A1 | 1/2002 | Golden | |
| 2002/0013389 A1* | 1/2002 | Taylor et al. | 524/59 |
| 2002/0068139 A1* | 6/2002 | Polak et al. | 428/36.5 |
| 2002/0120064 A1 | 8/2002 | Khandpur et al. | |
| 2002/0123575 A1 | 9/2002 | Kato et al. | |
| 2002/0136891 A1 | 9/2002 | Khandpur et al. | |
| 2002/0137808 A1 | 9/2002 | Gehlsen et al. | |
| 2003/0039792 A1 | 2/2003 | Hable et al. | |
| 2003/0042056 A1 | 3/2003 | Schneider et al. | |
| 2003/0057737 A1 | 3/2003 | Bock et al. | |
| 2003/0060522 A1 | 3/2003 | Czaplicki et al. | |
| 2003/0060523 A1 | 3/2003 | Czaplicki | |
| 2003/0069335 A1 | 4/2003 | Czaplicki et al. | |
| 2003/0090129 A1 | 5/2003 | Riley et al. | |
| 2003/0140671 A1 | 7/2003 | Lande et al. | |
| 2003/0176128 A1 | 9/2003 | Czaplicki et al. | |
| 2003/0183317 A1 | 10/2003 | Czaplicki et al. | |
| 2003/0186049 A1 | 10/2003 | Czaplicki et al. | |
| 2003/0187129 A1 | 10/2003 | Bell et al. | |
| 2004/0033324 A1 | 2/2004 | Meyer | |
| 2004/0063800 A1 | 4/2004 | Brantl et al. | |
| 2004/0079478 A1 | 4/2004 | Merz | |
| 2004/0084141 A1* | 5/2004 | Czaplicki | 156/294 |
| 2004/0131839 A1 | 7/2004 | Eagle | |
| 2004/0131840 A1 | 7/2004 | Ferguson et al. | |
| 2004/0180193 A1 | 9/2004 | Oda et al. | |
| 2004/0181013 A1 | 9/2004 | Schenkel | |
| 2004/0197545 A1 | 10/2004 | Gehlsen et al. | |
| 2004/0202881 A1 | 10/2004 | Everaerts et al. | |
| 2004/0229000 A1 | 11/2004 | Khandpur et al. | |
| 2004/0234774 A1 | 11/2004 | Cheng et al. | |
| 2004/0266898 A1 | 12/2004 | Kassa et al. | |
| 2005/0003222 A1 | 1/2005 | Everaerts et al. | |
| 2005/0016677 A1 | 1/2005 | Carlson et al. | |
| 2005/0020703 A1 | 1/2005 | Czaplicki et al. | |
| 2005/0048276 A1 | 3/2005 | Wilson | |
| 2005/0154089 A1 | 7/2005 | Taylor et al. | |
| 2005/0159511 A1 | 7/2005 | Kramer | |
| 2005/0159531 A1 | 7/2005 | Ferng et al. | |
| 2005/0221046 A1 | 10/2005 | Finerman | |

| | | |
|---|---|---|
| 2005/0230027 A1 | 10/2005 | Kassa et al. |

FOREIGN PATENT DOCUMENTS

| | | |
|---|---|---|
| EP | 0360 214 A2 | 3/1990 |
| EP | 0 442 178 A1 | 8/1991 |
| EP | 0 819 723 | 1/1998 |
| EP | 1 022 320 A1 | 7/2000 |
| EP | 1 055 699 A1 | 11/2000 |
| EP | 0 703 931 B1 | 10/2003 |
| EP | 1 240 266 B1 | 2/2004 |
| EP | 1391250 | 2/2004 |
| EP | 0 851 894 B1 | 4/2004 |
| EP | 1 272 587 B1 | 5/2004 |
| EP | 1 155 084 B1 | 6/2004 |
| EP | 1 431 325 A1 | 6/2004 |
| EP | 1 075 498 | 7/2004 |
| EP | 0 820 491 B1 | 8/2004 |
| EP | 0 947 529 B1 | 8/2004 |
| EP | 1 185 595 | 8/2004 |
| EP | 1 252 217 B1 | 8/2004 |
| EP | 449 868 A1 | 8/2004 |
| EP | 1 023 413 B1 | 9/2004 |
| EP | 1 155 082 B1 | 9/2004 |
| EP | 1 305 376 B1 | 9/2004 |
| EP | 1 155 053 B1 | 10/2004 |
| EP | 1 163 308 B1 | 10/2004 |
| EP | 1 471 105 A2 | 10/2004 |
| EP | 1 001 893 B1 | 11/2004 |
| EP | 1 115 770 B1 | 11/2004 |
| EP | 1 187 888 B1 | 11/2004 |
| EP | 1 574 537 | 9/2005 |
| JP | 56-004432 | 1/1981 |
| JP | 57-46810 * | 3/1982 |
| JP | 57-117542 | 7/1982 |
| JP | 4-59819 * | 2/1992 |
| JP | 04059819 | 2/1992 |
| JP | 4059820 | 2/1992 |
| JP | 9-249730 * | 9/1997 |
| JP | 9249730 | 9/1997 |
| JP | 10-139981 * | 5/1998 |
| JP | 10139981 | 5/1998 |
| JP | 2000-170736 * | 6/2000 |
| WO | WO 93/05103 | 3/1993 |
| WO | WO 95/33785 | 12/1995 |
| WO | WO 97/02967 | 1/1997 |
| WO | WO 97/12929 | 4/1997 |
| WO | WO 97/19124 | 5/1997 |
| WO | WO 98/52997 | 11/1998 |
| WO | WO 99/02578 | 1/1999 |
| WO | WO 00/12571 | 3/2000 |
| WO | WO 00/12595 | 3/2000 |
| WO | WO 00/13876 | 3/2000 |
| WO | WO 00/20483 | 4/2000 |
| WO | WO 00/37242 | 6/2000 |
| WO | WO 00/37554 | 6/2000 |
| WO | WO 00/39232 | 7/2000 |
| WO | WO 00/40629 | 7/2000 |
| WO | WO 00/52086 | 9/2000 |
| WO | WO 01/46303 * | 6/2001 |
| WO | WO 01/57130 A1 | 8/2001 |
| WO | WO 01/88033 A1 | 11/2001 |
| WO | WO 02/070620 | 9/2002 |
| WO | WO 02/088214 | 11/2002 |
| WO | WO 03/011954 | 2/2003 |
| WO | WO 03/040251 | 5/2003 |
| WO | WO 03/054069 | 7/2003 |
| WO | WO 03/059997 | 7/2003 |
| WO | WO 03/072677 | 9/2003 |
| WO | WO 03/078163 A1 | 9/2003 |
| WO | WO 03/095575 A2 | 11/2003 |
| WO | WO 04/050740 | 6/2004 |
| WO | WO 04/055092 | 7/2004 |
| WO | WO04/060956 A1 | 7/2004 |
| WO | WO 04/060984 | 7/2004 |
| WO | WO 04/062869 | 7/2004 |
| WO | WO 04/065485 | 8/2004 |
| WO | WO 04/076507 | 9/2004 |
| WO | WO 04/085510 | 10/2004 |
| WO | WO 04/085564 | 10/2004 |
| WO | WO 04/099312 | 11/2004 |
| WO | WO 05/007720 | 1/2005 |
| WO | WO 05/047393 A1 | 5/2005 |
| WO | WO 05/090431 | 9/2005 |
| WO | WO 05/090455 | 9/2005 |
| WO | WO 05/095484 | 10/2005 |

OTHER PUBLICATIONS

Born et al., "Structural Bonding in Automotive Applications".
Zalobsky et al., "Recommendations on Selection and Use of Cavity Reinforcement Materials" Proceedings of the 1999 Noice and Vibration Conference.
Weber et al., "Characterizing the In Vehicle Performance of Expandable Sealants Used As Acoustic Baffles", Proceedings of the 1999 Noice and Vibrations Conference.
Weber et al., "Requirements for Improved Performance of Specialty Sealing and Bonding Materials for Automotive Applications", SAE 2000 World Congress, Mar. 6-9, 2000.
Liu et al., "Validation of Epoxy of Foam for Structural and Crash Application". 2004 SAE World Congress, Mar. 8-11, 2004.
Schulenburg et al., "Structural Adhesives- Improvements in Vehicle Crash Performance", in Vehicle Crash Performance, 2004 SAE World Congress, Mar. 8-11, 2004.
Casey et al., "Expandable Epoxy Foam: A Systematic Approach to Improve Vehicle Performance", 2004 SAE World Congress, Mar. 8-11, 2004.
International Search Report dated Nov. 25, 2004. PCT/US04/006258. (1001.137wo).
"The Epoxy Book", A System Three Resins Publication, pp. 1-41, System Three Resins, Inc., Seattle, Washington.
"Epoxy Resins", Second Edition Encyclopedia of Polymer Science and Engineering, vol. 6, pp. 322-382, 1985.
Copending U.S. Appl. No. 09/847,252 filed May 2, 2001.
Copending U.S. Appl. No. 09/858,939 filed May 16, 2001.
Copending U.S. Appl. No. 09/459,756 filed Dec. 10, 1999.
Copending U.S. Appl. No. 09/939,245 filed Aug. 24, 2001.
Copending U.S. Appl. No. 10/646,439 filed Aug. 21, 2003.
Copending U.S. Appl. No. 10/217,991 filed Aug. 13, 2002.
Copending U.S. Appl. No. 10/635,064 filed Aug. 6, 2003.
Copending U.S. Appl. No. 60/451,811 filed Mar. 4, 2003.

* cited by examiner

FIG. 9 is a schematic view of a synthetic material being formed in accordance with an aspect of the present invention.

ACTIVATABLE MATERIAL FOR SEALING, BAFFLING OR REINFORCING AND METHOD OF FORMING SAME

FIELD OF THE INVENTION

The present invention relates generally to an activatable material, a method of forming the activatable material and a method of using the activatable material for sealing, baffling or reinforcing of components of articles of manufacture such as automotive vehicles.

BACKGROUND OF THE INVENTION

For many years industry, and particularly the transportation industry has been concerned with sealing, baffling, acoustic attenuation and reinforcement of articles of manufacture such as automotive vehicles. In turn, industry has developed a wide variety of materials for providing such sealing, baffling and reinforcement. The present invention, therefore, seeks to provide an improved material for sealing, baffling or reinforcement, a method of forming the improved material and a method for use of the improved material for reinforcing, sealing or baffling.

SUMMARY OF THE INVENTION

Accordingly, the present invention provides an activatable material and a method of sealing, baffling or reinforcing a portion of an article of manufacture such as an automotive vehicle with the activatable material. The activatable material typically includes an epoxy resin, a thermoplastic polyether and a curing agent. The activatable material may be applied to a surface of a carrier member, a surface of a component of the article of manufacture or any other substrate. According to one preferred embodiment the activatable material is inserted into a cavity of an automotive vehicle, although it is contemplated that the activatable material may be applied to any location of the vehicle. In such an embodiment, the activatable material may be applied to the carrier member prior to insertion into the cavity, although certainly not required. After application, the activatable material is preferably activated to bond the activatable material to surfaces of any substrate to which it has been applied.

According to one highly preferred embodiment, the activatable material is formed into a powder and applied to an adhesive material to form a synthetic material with a tacky surface and a non-tacky surface. Thereafter, the non-tacky surface may be contacted so as to bring the tacky surface into contact with a component of an article of manufacture.

DETAILED DESCRIPTION

The present invention is predicated upon an improved activatable material, and articles incorporating the same. The activatable material preferably assists in providing structural reinforcement, adhesion, sealing, acoustical damping properties or a combination thereof within a cavity of or upon a surface of a structure, or to one or more structural members (e.g., a body panel or structural member) of an article of manufacture (e.g., an automotive vehicle). As used herein, the phrase activatable material includes any material may be activated to change states by an ambient condition or another condition. For example, the material may expand, flow, melt, cure, a combination thereof or the like upon exposure to a condition such a heat, pressure, chemical exposure, combinations thereof or the like.

The activatable material typically includes an epoxy resin and a thermoplastic polyether, and optionally, one or a combination of a blowing agent, a curing agent or a filler. The activatable material preferably includes at least three of the following:

(a) up to about 80 parts by weight of an epoxy resin;
(b) up to about 70 parts by weight of a thermoplastic polyether;
(c) up to about 5 parts by weight of a blowing agent;
(d) up to about 7 parts by weight of a curing agent; and
(e) a filler.

The concentration may be higher or lower depending upon the intended application of the activatable material. In a preferred aspect of the invention, the amount by weight epoxy resin to thermoplastic polyether is from about 1:10 to about 10:1, more preferably about 1:5 to about 5:1 and still more preferably about 1:3 to about 3:1.

The activatable material of the present invention may be applied to various articles of manufacture for adding structural integrity to portions or members of articles, for providing acoustical damping to the articles or for sealing the articles. Examples of such articles of manufacture include, without limitation, household or industrial appliances, furniture, storage containers, buildings, structures or the like. In preferred embodiments, the activatable material is applied to portions of an automotive vehicle such as body or frame members (e.g., a vehicle frame rail) of the automotive vehicle. One method of the present invention contemplates applying the activatable material to a surface of one of the above structures in an unexpanded or partially expanded state and activating the material for expanding it to a volume greater than its volume in the unexpanded state (e.g., at least 50% greater, at least 100% greater, at least 500% greater, at least 1000% greater, at least 2000% greater, at least 5000% greater or higher).

Percentages herein refer to weight percent, unless otherwise indicated.

Epoxy Resin

Epoxy resin is used herein to mean any of the conventional dimeric, oligomeric or polymeric epoxy materials containing at least one epoxy functional group. The polymer-based materials may be epoxy-containing materials having one or more oxirane rings polymerizable by a ring opening reaction. In preferred embodiments, the activatable material includes up to about 80% or more of an epoxy resin. More preferably, the expandable includes between about 10% and 70% by weight epoxy resin and still more preferably between about 40% and 60% by weight epoxy resin. Of course, amounts of epoxy resin may be greater or lower depending upon the intended application of the activatable material. As an example, it is contemplated that weight percentages may be lower (e.g., between about 5% and about 30%) when other ingredients such as the thermoplastic polyether, a filler, alternative polymers, combinations thereof or the like are used in greater weight percentages (e.g., between about 30% and about 80%).

The epoxy may be aliphatic, cycloaliphatic, aromatic or the like. The epoxy may be supplied as a solid (e.g., as pellets, chunks, pieces or the like) or a liquid (e.g., an epoxy resin). The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferably, an epoxy resin is added to the activatable material to increase the adhesion and flow properties of the material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive. Moreover, various mixtures of several different epoxy resins may be employed as well.

Thermoplastic Polyether

The activatable material typically includes one or more thermoplastic polyethers. When included, the one or more thermoplastic polyethers preferably comprise between about 1% and about 90% by weight of the activatable material, more preferably between about 3% and about 60% by weight of the activatable material and even more preferably between about 5% and about 25% by weight of the activatable material. As with the other materials, however, more or less thermoplastic polyether may be employed depending upon the intended use of the activatable material.

The thermoplastic polyethers typically include pendant hydroxyl moieties. The thermoplastic polyethers may also include aromatic ether/amine repeating units in their backbones. The thermoplastic polyethers of the present invention preferably have a melt index between about 5 and about 100, more preferably between about 25 and about 75 and even more preferably between about 40 and about 60 grams per 10 minutes under load of 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis(secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464,924 and 5,962,093, which are incorporated herein by reference for all purposes. Particularly preferred thermoplastic polyethers are sold under the tradename BLOX® and is commercially available from the Dow Chemical Corporation, Midland, Mich. Advantageously, the thermoplastic polyethers can provide the activatable material with various desirable characteristics such as desirable physical and chemical properties for a wide variety of applications as is further described herein.

Blowing Agent

One or more blowing agents may be added to the activatable material for producing inert gasses that form, as desired, an open and/or closed cellular structure within the activatable material. In this manner, it may be possible to lower the density of articles fabricated from the material. In addition, the material expansion helps to improve sealing capability, acoustic damping or both.

The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4,-oxy-bis-(benzenesulphonylhydrazide), trihydrazinotriazine and $N,N_i$-dimethyl-$N,N_i$-dinitrosoterephthalamide.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles.

Amounts of blowing agents and blowing agent accelerators can vary widely within the activatable material depending upon the type of cellular structure desired, the desired amount of expansion of the activatable material, the desired rate of expansion and the like. Exemplary ranges for the amounts of blowing agents and blowing agent accelerators in the activatable material range from about 0% by weight to about 5% by weight and are preferably in the activatable material in fractions of weight percentages.

In one embodiment, the present invention contemplates the omission of a blowing agent. Preferably, however, the material, the blowing agent or both of the present invention are thermally activated. Alternatively, other agents may be employed for realizing activation by other means, such as moisture, radiation, or otherwise.

Curing Agent

One or more curing agents and/or curing agent accelerators may be added to the activatable material. Amounts of curing agents and curing agent accelerators can, like the blowing agents, vary widely within the activatable material depending upon the type of cellular structure desired, the desired amount of expansion of the activatable material, the desired rate of expansion, the desired structural properties of the activatable material and the like. Exemplary ranges for the curing agents or curing agent accelerators present in the activatable material range from about 0% by weight to about 7% by weight.

Preferably, the curing agents assist the activatable material in curing by crosslinking of the polymers, epoxy resins or both. It is also preferable for the curing agents to assist in thermosetting the activatable material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the activatable material.

Though longer curing times are also possible, curing times of less than 5 minutes, and even less than 30 seconds are possible for the formulation of the present invention.

Filler

The activatable material may also include one or more fillers, including but not limited to particulated materials (e.g., powder), beads, microspheres, or the like. Preferably the filler includes a relatively low-density material that is generally non-reactive with the other components present in the activatable material. While the fillers may generally be present within the activatable material to take up space at a relatively low weight, it is contemplated that the fillers may also impart properties such as strength and impact resistance to the activatable material.

Examples of fillers include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers in the activatable material can range from 10% to 90% by weight of the activatable material. According to some embodiments, the activatable material may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

Other Components and Additives

It is contemplated that most nearly any additional chemicals, materials or otherwise may be added to the activatable material assuming they are suitable for the activatable material and suitable for a chosen application of the activatable material.

Additional polymers may be included in the activatable material in amounts between about 0.01% and about 80% by weight, more preferably between about 1% and about 40% by weight and even more preferably between about 3% and about 20% by weight of the activatable material. Possible polymers include, without limitation, elastomer-containing adducts, halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylates or ethylene ethyl acrylate maleic anhydride terpolymers) or mixtures thereof. Other potential polymeric materials may be or may include include, without limitation, polyethylene, polypropylene, polystyrene, polyolefin, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

Other additives, agents or performance modifiers may also be included in the activatable material as desired, including but not limited to a UV resistant agent, a flame retardant, an impact modifier, a heat stabilizer, a colorant, a processing aid, a lubricant, a reinforcement (e.g., chopped or continuous glass, ceramic, aramid, or carbon fiber, particulates or the like).

When determining appropriate components for the activatable material, it may be important to form the material such that it will only activate (e.g., flow, foam or otherwise change states) at appropriate times or temperatures. For instance, in most applications, it is undesirable for the material to be reactive at room temperature or otherwise at the ambient temperature in a production environment. More typically, the activatable material becomes activated to flow at higher processing temperatures. As an example, temperatures such as those encountered in an automobile assembly plant may be appropriate, especially when the activatable material is processed along with the other components at elevated temperatures or at higher applied energy levels, e.g., during painting preparation steps. Temperatures encountered in many coating operations (e.g., in a paint curing oven), for instance, range up to about 250° C. or higher.

Formation and Application of the Activatable Material

Formation of the activatable material can be accomplished according to a variety of new or known techniques. Preferably, the activatable material is formed as a material of substantially homogeneous composition. However, it is contemplated that various combining techniques may be used to increase or decrease the concentration of certain components in certain locations of the activatable material.

According to one embodiment, the activatable material is formed by supplying the components of the material in solid form such as pellets, chunks and the like, in liquid form or a combination thereof. The components are typically combined in one or more containers such as large bins or other containers. Preferably, the containers can be used to intermix the components by rotating or otherwise moving the container. Thereafter, heat, pressure or a combination thereof may be applied to soften or liquidize the components such that the components can be intermixed by stirring or otherwise into a single homogenous composition.

According to another embodiment, the activatable material may be formed by heating one or more of the components that is generally easier to soften or liquidize such as the polymer based materials to induce those components into a mixable state. Thereafter, the remaining components may then be intermixed with the softened components.

Depending upon the components used, it may be important to assure that the temperature of the components remains below certain activation temperatures that might cause the activatable material to activate (e.g., form gasses, flow or otherwise activate), cure (e.g., harden, stiffen or otherwise change states) or both. Notably, when the activatable material contains a blowing agent, it is typically desirable to maintain the temperature of the activatable material below a temperature that will activate the blowing agent during formation of the activatable material or before the activatable material is applied to a surface. In situations where it is desirable to maintain the activatable material at lower temperatures it may be desirable to maintain the components in a semi-solid or viscoelastic state using pressure or a combination of pressure and heat to intermix the components of the activatable material. Various machines have been designed to applying heat, pressure or both to materials.

After formation of the activatable material, the material is typically applied to a surface or substrate and activated. Activation of the material may include at least some degree of foaming or bubbling in situations where the activatable material includes a blowing agent. Such foaming or bubbling can assist the activatable material in wetting a substrate and forming an intimate bond with the substrate. Alternatively, however, it shall be recognized that the activatable material may be activated to flow without foaming or bubbling and may still substantially wet the substrate to form an intimate bond. Formation of the intimate bond will typically but not necessarily occur upon curing of the activatable material.

It shall be understood that, depending upon its the intended application, the activatable material may be applied and activated in different ways and at different times. Thus, exemplary uses of the activatable material are discussed below to illustrate preferred methodologies of application and activation of the activatable material. In particular, the activatable material may used for, amongst others, reinforcement, sealing and adhering, acoustic baffling or the like.

Reinforcement

The activatable material may be used to reinforce structural members of an article of manufacture. When used for reinforcement, the activatable material may be employed by itself, may be employed in conjunction with other materials (e.g., a backing), may be applied to a carrier member or the like.

According to one embodiment, the activatable material of the present invention is applied to a carrier member to form a reinforcement member and the reinforcement member is inserted within a cavity formed by a structural member of an automotive vehicle. The structural member of the automotive vehicle may be nearly any member of the vehicle including, but not limited to, frame members, body member, pillar structures, closure panels, roof assemblies, bumpers, combinations thereof or the like.

The carrier member may be selected from a variety of conventional and novel configurations. The activatable material of the present invention may thus be applied to a carrier member, such as a molded, extruded or stamped member (e.g., metal or plastic, foamed or unfoamed; exemplary materials of which include aluminum, magnesium, titanium, steel, molding compound (e.g., sheet or bulk molding compound), polyamide (e.g., nylon 6 or nylon 6,6), polysulfone, thermoplastic imide, polyether imide, polyether sulfone or mixtures thereof.

Examples of carrier members, structural reinforcement applications or the like, which may be employed in the present invention are disclosed in U.S. Pat. Nos. 6,474,723; 6,467,834; 6,419,305; 6,358,584; 6,311,452; 6,296,298; 6,263,635, all of which are hereby incorporated by reference. Other examples are disclosed in U.S. patent application Ser. Nos. 10/236,315; 10/098,952; 10/337,446; 09/939,152; 09/459,756; 60/409,625; 60/333,273; 60/317,201 all of which are also incorporated herein by reference for all purposes.

Figure 1:
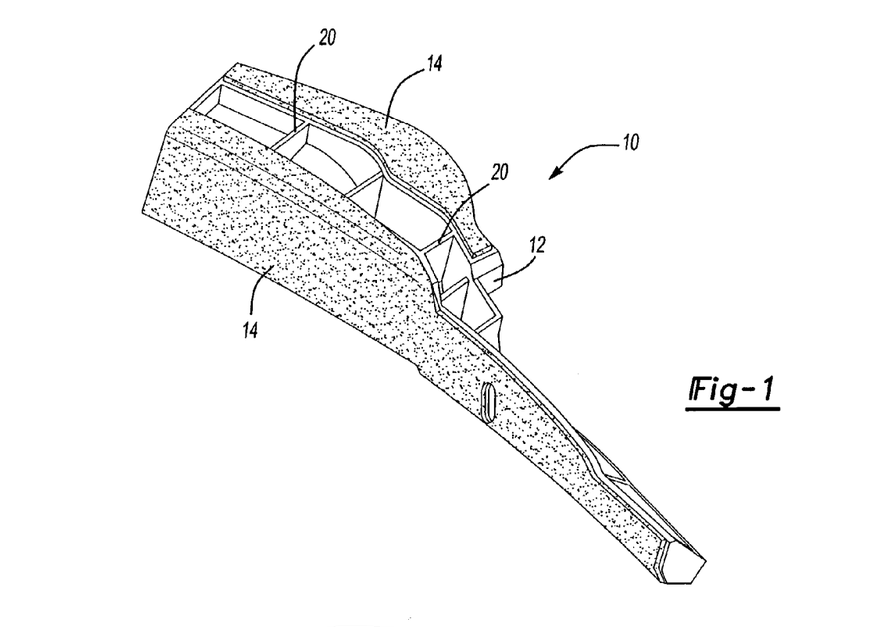
FIG. 1 is a perspective view of a reinforcement member formed in accordance with an aspect of the present invention.

For purposes of illustration, FIG. 1 shows a reinforcement member 10 comprised of a carrier member 12 having masses 14 of activatable material disposed thereon. As shown the carrier member 12 is skeletal and includes a plurality of ribs 20. Moreover, the activatable material has been disposed upon the carrier member 12 in layers of substantially uniform thickness. It is contemplated however, that the carrier member 12 and the activatable material may be formed according to any suitable shape or configuration depending upon their intended application.

Figure 2:
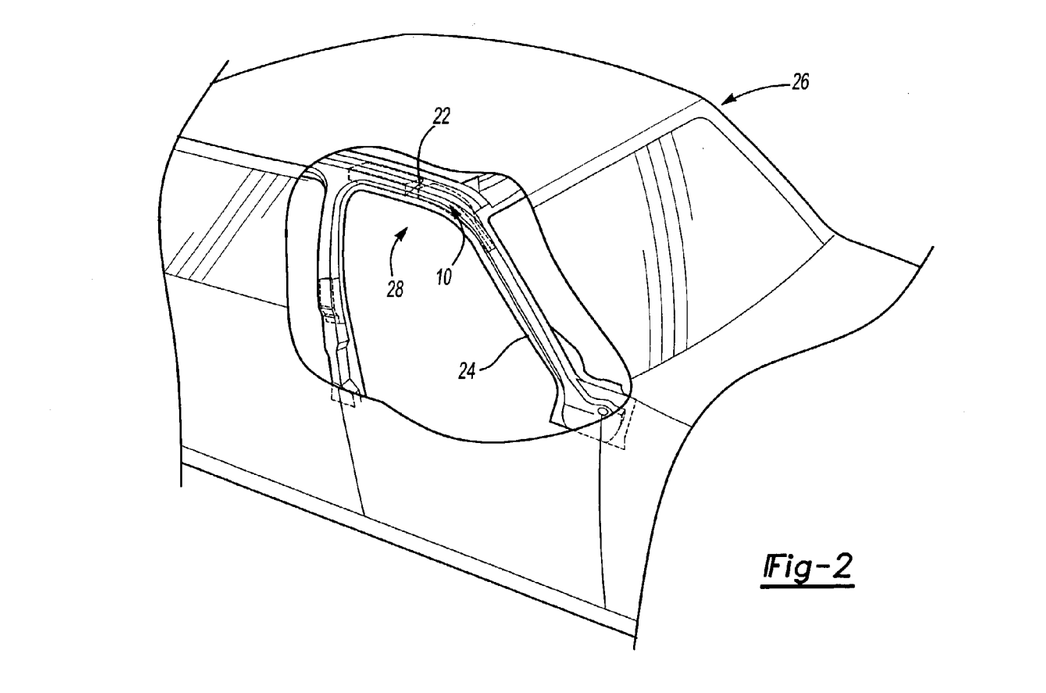
FIG. 2 is a perspective view of an automotive vehicle according to an aspect of the present invention.

The exemplary reinforcement member 10, as shown in FIG. 2, has been inserted into a cavity 22 that is defined by a pillar structure 24 of an automotive vehicle 26. After insertion into the cavity 22, the masses 14 of activatable material are preferably activated to adhere to walls of the pillar structure 24 that define the cavity 22. For example, the masses 14 may be exposed to elevated temperature in an e-coat or painting operation thereby causing the masses 14 of activatable material to become flowable and expand to contact the walls of the pillar structure 24. At the same time or thereafter, the masses 14 may cure to adhere and bond to the walls of the pillar structure 24 thereby forming a reinforced structural system 28 for the vehicle 26.

Figure 3:
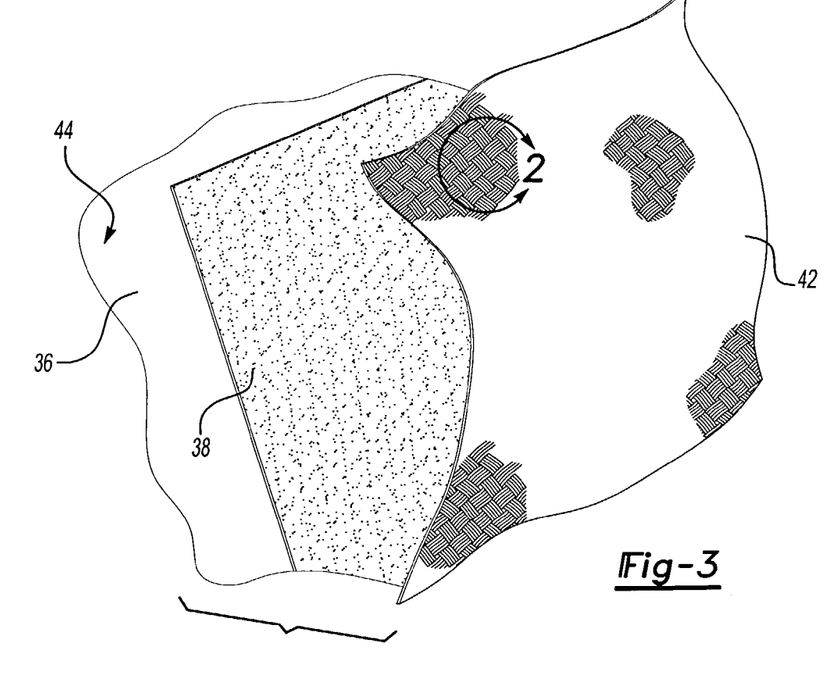
FIG. 3 is a perspective view of a panel being reinforced in accordance with an aspect of the present invention.
Figure 4:
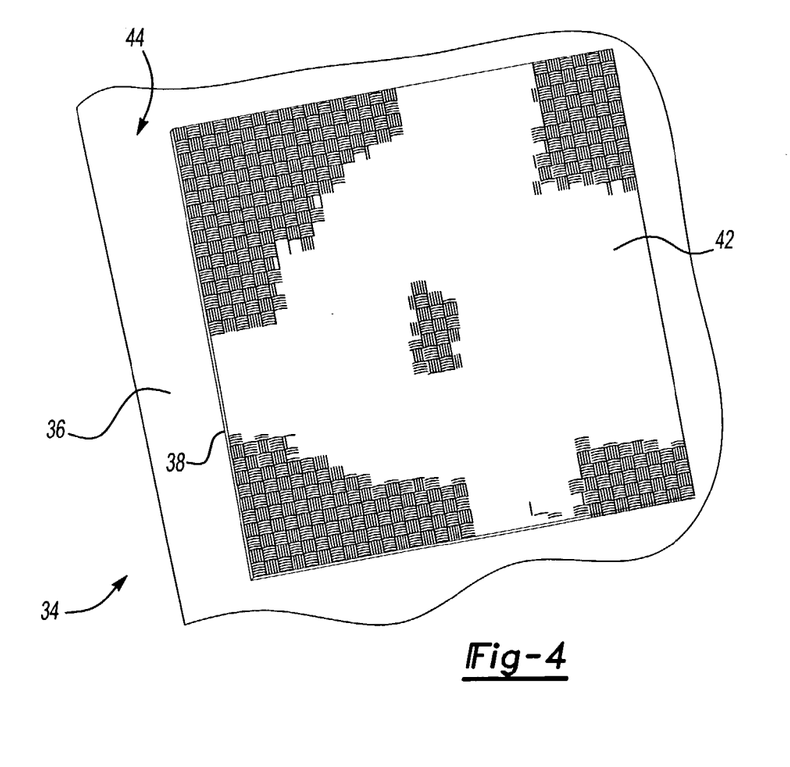
FIG. 4 is a perspective view of a reinforced panel formed in accordance with an aspect of the present invention.

Also for purposes of illustration, FIGS. 3 and 4 show the formation of a reinforced panel 34 comprised of a panel 36, a layer 38 of activatable material and a backing material 42. The panel 36 may be provided by any suitable component of the automotive vehicle. According preferred embodiment, the panel 36 is provided as an inner or outer body panel (e.g., a door panel, a roof panel, a side panel, a closure panel or the like) of the vehicle.

The backing material 42 may be chosen from a variety of materials. For example, and without limitation, the backing material may be formed of metal foils, metal sheets, metal screens or the like. As alternative examples, the backing material may be formed of polymeric (e.g., thermoplastic) films, sheets or mesh. In still other alternative embodiments, the backing material may be formed of cellulose fiber material such as impregnated or non-impregnated paper, wood or the like.

The reinforced panel 34 is formed by applying the layer 38 of activatable material to a surface 44 of the automotive vehicle panel 36 and applying the backing material 42 to the layer 38 of activatable material. It should be understood that the layer 38 of activatable material may be applied to the automotive vehicle panel 36 before, after or simultaneous with application of the backing material material 42 to the layer 38.

After application, the layer 38 of activatable material is preferably activated to adhere and bond to the panel 36 and the backing material 42. For example, the layer 42 may be exposed to elevated temperature in an e-coat or painting operation thereby causing the layer 42 of activatable material to become flowable and expand to contact and wet the panel 36 and the backing material 42. At the same time or thereafter, the layer 42 may cure to adhere to the panel 36 and the backing material 42 thereby forming the reinforced panel 34.

One exemplary activatable material that is particularly suitable for use in reinforcement application is in table I below.

TABLE I

| Ingredient | Percent of Formula Wt. % |
| --- | --- |
| Thermoplastic Polyether | 4.57 |
| 2-Propenoic acid, 2-methyl-, oxiranylmethyl ester, polymer with ethane and methyl 2-propenoate | 0.31 |
| Polymer of Epoxy Resin & Bisphenol A | 12.79 |
| P-Aramide Fiber | 2.74 |
| Ethylene Methyl Acrylate Copolymer | 3.47 |
| 2-Propenenitrile, polymer with 1,3-butadiene, carboxy-terminated, polymer with bisphenol A diglycidyl ether homopolymer and epichlorohydrin-formaldehyde-phenol polymer | 38.55 |
| Polymer of Epoxy Resin & Bisphenol A | 18.31 |
| Reaction Product of Epichlorolhydrin Bisphenol A | 6.27 |
| Epoxy Phenol Novolac Resin | 2.89 |
| Epoxy Flexibilizer | 2.55 |
| Azodicarbonamide (90%) & Benzenesulfinic Acid, Zinc Salt (10%) | 0.71 |
| Azodicarbonamide | 1.38 |
| Modified Urea | 0.37 |
| Nanoclay | 1.34 |
| Cyanoguanidine | 3.41 |
| Pigment | 0.34 |

While table I provides one specific formulation, it is contemplated that weight percentages of the various components may be varied by +/−20%, by +/−50% or more. Moreover, components may be removed or added and components may be replaced. For example, it may be desirable to omit one or more of the modified urea, nanoclay, cyanoguanidine, pigment or other ingredients. Further, other blowing agent may be substituted as may other methacrylates, epoxies, fillers, fibers or otherwise.

Structural Adhesive

According to another embodiment, it is contemplated that an activatable material according to the present invention may be employed as a structural adhesive material. In such an embodiment, the material is typically activated and cured (e.g., at temperatures common to e-coat or automotive painting operatings) to adhere to a first member and a second member. Contact with attachment surface of the first member and the second member may occur prior to or during activation and curing of the material. Examples of structural adhesive applications are disclosed in U.S. patent application Ser. Nos. 10/234,902; 10/386,287; 60/451,811, all of which are incorporated herein by reference for all purposes.

Figures 5, 6, 7:
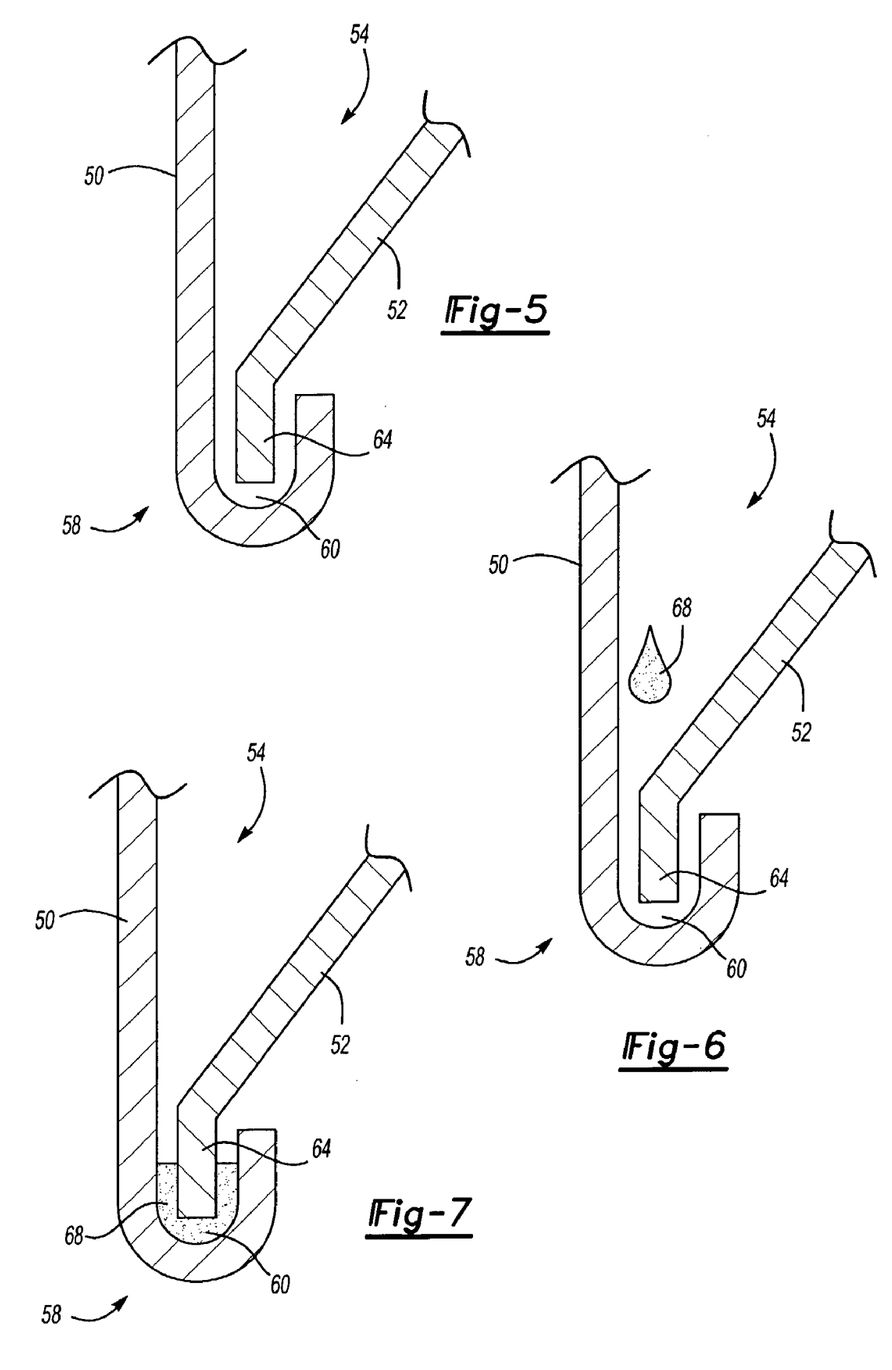
FIGS. 5–7 illustrate members being adhered together according to an aspect of the present invention.

Referring to FIG. 5–7, there is illustrated a first member 50 and a second member 52 that come together to form a joint 54 (e.g. a hem flange joint) hem flange. As shown the first member 50 has an end portion 58 that forms a cavity 60 for receiving a free end 64 of the second member 52, which may be positioned as desired within the cavity 60. An activatable material 68 according to the present invention is also positioned within the cavity 60 such that upon activation and curing of the material 68, the first member 50 is adhered to the second member 52. Of course, it is contemplated that the activatable material of the present invention may be employed to structurally adhere any members together. Examples of suitable materials and applications, which may benefit from the activatable material of the present invention are included in U.S. Pat. No. 5,985,435, which is incorporated herein for all purposes.

One exemplary activatable material that is particularly suitable for use as a structural adhesive is in table II below.

TABLE II

| Ingredient | Weight % |
| --- | --- |
| Ethylene Methyl Acrylate Copolymer | 53.69 |
| Thermoplastic Polyether | 9.76 |
| Polymer of Epoxy Resin and Bisphenol | 34.17 |
| Cyanoguanidine or Dicyandiamide | 1.95 |
| Blowing agent | 0.23 |
| Pigment | 0.20 |

While table II provides one specific formulation, it is contemplated that weight percentages of the various components may be varied by +/−20%, by +/−50% or more. Moreover, components may be removed or added and component may be replaced.

Non-Tacky Surface

In another embodiment of the present invention, an outer surface of the material of the present invention is treated for allowing it to be handled without undesirable material transfer or tackiness. Thus, it is possible that a synthetic material may be provided with a layer (from less than about 10 microns to about 2 cm (e.g., on the order of less than about 1 mm)) that is generally free of tack for facilitating handling. This layer may take the form of a plastic transfer film, a water based coating, a powder coating or otherwise. The present invention thus also contemplates a tacky structural adhesive material having a layer providing handling surface that is generally free of tack to the touch. It is also contemplated that the structural adhesive material, the layer or both may be formed of the activatable material of the present invention.

Figure 8:
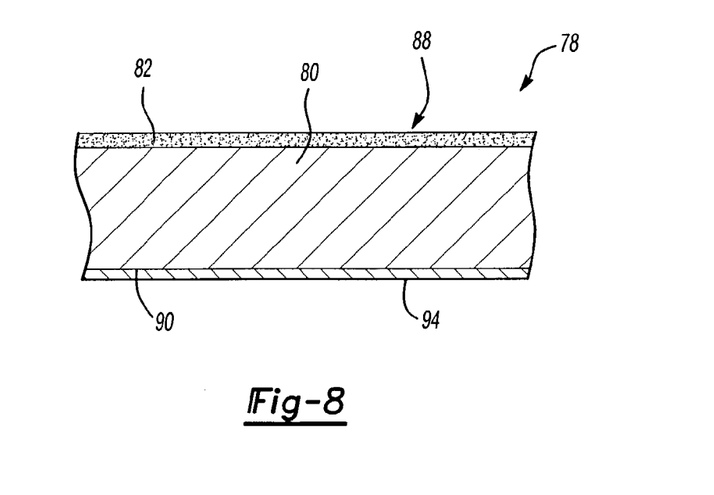
FIG. 8 is a sectional view of a synthetic material formed in accordance with an aspect of the present invention.
Figure 9:
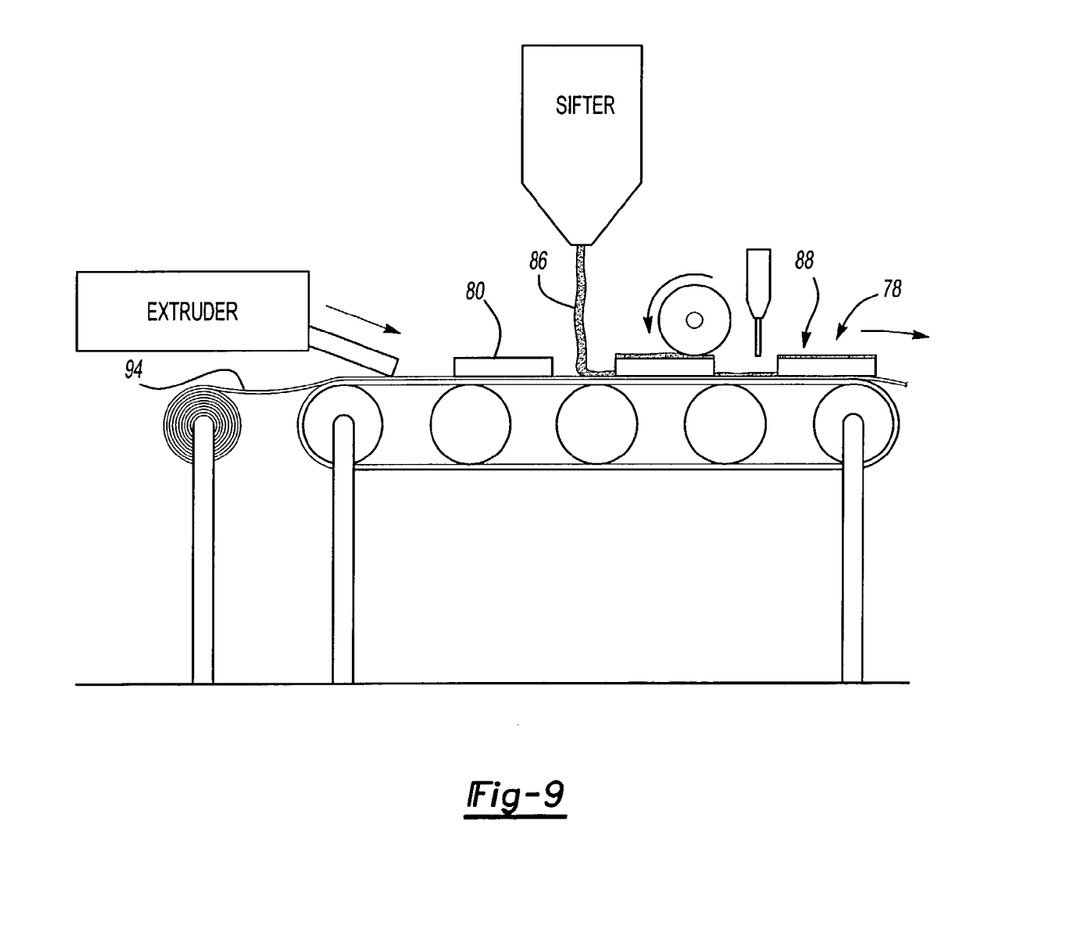

Referring to FIG. 8, there is illustrated a synthetic material 78 having a layer 80 of structural adhesive material having a layer 82 of substantially tack-free material (i.e., tack-free at room temperature of about 20° C.) disposed thereon. As shown in FIG. 9, the layer 82 of substantially tack-free material is forced by applying a powder 86 or other particulated form that is pressed (e.g., rolled via a roller) into intimate contact with the layer 80 of adhesive material.

Layers of substantially tack-free material and layers of tacky material, which could benefit from the use of the activatable material of the present invention are disclosed in copending applications Ser. Nos. 10/217,991; 60/415,511, which are incorporated herein for all purposes. Moreover, it is contemplated that the layers of substantially tack-free material and the layers of structural adhesive material may include correspondence components as described in the aforementioned application.

Advantageously, the layer 82 of substantially tack-free material provides a substantially tack-free surface 88, which may be contacted by an individual, with a machine or otherwise such that a tacky surface 90 of the adhesive material may be contacted with a surface of a carrier member, a member of an article of manufacture (e.g., an automotive vehicle) or the like. As shown in FIGS. 8 and 9, the tacky surface 90 may be temporarily covered with a protective layer 94 (e.g., release tape) until application of the material to a surface.

One exemplary activatable material that is particularly suitable for use in structural powder applications is in table III below.

TABLE III

| Ingredient | Wt. % |
| --- | --- |
| Solid Epoxy Resin | 20.53 |
| Thermoplastic Polyether | 11.17 |
| Epoxy/Elastomer Adduct | 11.91 |
| Nanoclay | 1.79 |
| Solid Epoxy Resin in Diglycidyl Ether | 45.39 |
| Dicyandiamide | 9.13 |
| Pigment | 0.08 |

While table I provides one specific formulation, it is contemplated that weight percentages of the various components may be varied by +/−20%, by +/−50% or more. Moreover, components may be removed or added and component may be replaced.

Extrusion

Regardless of the particular use, it has been found that activatable materials according to the present invention are particularly suitable for processing and/or application via extrusion. According to one preferred embodiment of the present invention, various components may be premixed into one, two or more pre-mixtures and introduced at one or various locations in a single or twin-screw extruder. Thereafter, the heat and pressure provided by the extruder mixes the activatable material into a single generally homogeneous composition, and preferably does so without activating the material. The material of the present invention may be applied, by extrusion, to any suitable surface of a carrier, a member of an article of manufacture (e.g., an automotive vehicle) or the like. In one embodiment, an automated or robotic extrusion applicator (e.g., a mini-applicator) is employed. Examples of these types of application and applicators are disclosed in U.S. Pat. No. 5,358,397 and U.S. patent application Ser. No. 10/342,025 both of which are hereby incorporated by reference for all purposes.

One exemplary activatable material that is particularly suitable for use in extrusion techniques is in table IV below.

TABLE IV

| Ingredient name: | Wt. % |
| --- | --- |
| Solid Epoxy Resin | 36.08 |
| Nanoclay | 1.96 |
| Terpolymer of Ethylene, Methyl Acrylate Monomer and Glycidyl Methacrylate | 26.24 |
| Thermoplastic Polyether | 3.28 |
| Flexibilizer | 6.56 |
| Liquid Epoxy Resin | 3.28 |
| Epoxy Phenol Novalac Resin | 4.92 |
| Dicyandiamide | 3.28 |

TABLE IV-continued

| Ingredient name: | Wt. % |
| --- | --- |
| Modified Urea | 1.32 |
| Activated Azodicarbonamide | 2.29 |
| Pigments | 0.30 |
| Aramid Fiber | 1.96 |
| Epoxy/Elastomer Adduct | 8.53 |

While table IV provides one specific formulation, it is contemplated that weight percentages of the various components may be varied by +/−20%, by +/−50% or more. Moreover, components may be removed or added and components may be replaced.

According to another preferred application, the activatable material of the present invention can be formed as masses (e.g., strands, strips or the like), which can be packaged together in contact with each other or separated (e.g., by release tape). According to such embodiment, the masses are preferably separable from each other without experiencing any substantially cohesive failure from bonding with adjacent masses. Thus, the masses may be peeled away from one another and applied to a substrate (e.g., a carrier, a member or otherwise) in manners described herein. Preferably such activatable material can be heated to expand and cure as described herein as well, although not necessarily required.

Advantageously, the activatable material of the present invention has shown valuable properties in its applications. In particular, it has been found that the addition of various amount of thermoplastic polyethers as described herein can produce activatable materials that have relatively good adhesive properties upon curing. Moreover, activatable materials according to the present invention can exhibit relatively high strength moduli while also exhibiting relatively high strain to failure ratios.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of sealing, baffling or reinforcing a portion of an automotive vehicle, the method comprising:
   providing an activatable material, the activatable material including:
   i) 30% to about 80% by weight epoxy resin;
   ii) 5% to about 25% by weight thermoplastic polyether selected from a polyetheramine and a polyamino ether; and
   iii) a curing agent;

applying the activatable material to a surface of a carrier member;

inserting the carrier member with the activatable material disposed thereon into a cavity that is at least partially defined by a structural member of the automotive vehicle; and exposing the activatable material to heat thereby activating the activatable material to bond to surfaces of the structural member;

wherein the thermoplastic polyether has a melt index between about 25 and about 75 per 10 minutes under a load of 2.16 Kg at a temperature of 190° C.

2. A method as in claim 1 wherein the step of exposing the activatable material occurs in an automotive e-coat or painting operation and the activating of the activatable material includes foaming and curing of the activatable material.

3. A method as in claim 1 wherein the thermoplastic polyether includes a polymer backbone and includes aromatic ether/amine repeating units in the backbone.

4. A method as in claim 1 further comprising, forming the thermoplastic polyether by reacting a difunctional amine with a glycidyl ether.

5. A method as in claim 1 wherein the activatable material includes a blowing agent.

6. A method as in claim 5 wherein the blowing agent is selected from an azodicarbonamide, a dinitrosopentamethylenetetramine, a 4,4,-oxy-bis-(benzenesulphonylhydrazide), a trihydrazinotriazine and a N,N,-dimethyl-N,N,-dinitrosoterephthalamide.

7. A method as in claim 5 wherein the activatable material includes an ingredient selected from a filler, a clay, a blowing agent accelerator, a curing agent accelerator, and a flexiblizer.

8. A method as in claim 1 wherein the activatable material further includes a polymeric material selected from an elastomer-containing adduct, a halogenated polymer, a polycarbonate, a polyketone, a urethane, a polyester, a silane, a sulfone, an allyl, an olefin, a styrene, an acrylate, a silicone, a phenolic, a polyphenylene oxide, a terphthalate and an acetate.

9. A method as in claim 1 wherein applying the activatable material includes extruding the activatable material onto the surface of the carrier member.

10. A method as in claim 1 wherein the activatable material is substantially tack free.

11. A method as in claim 1 wherein the step of applying the activatable material to a surface of a carrier member forms a reinforcement member wherein the carrier member is skeletal and includes a plurality of ribs.

12. A method of sealing, baffling or reinforcing a portion of an automotive vehicle, the method comprising:

providing an activatable material, the activatable material including:
  i) between about 40% and about 60% by weight epoxy resin;
  ii) between about 5% and about 25% by weight thermoplastic polyether selected from a polyetheramine and a polyamino ether; and
  iii) a curing agent;

locating the activatable material within a cavity or upon a surface of a structure of the automotive vehicle; and exposing the activatable material to heat thereby activating the activatable material to bond to surfaces of the structure;

wherein the thermoplastic polyether has a melt index between about 25 and about 75 per 10 minutes under load of 2.16 Kg at a temperature of 190° C.

13. A method as in claim 12 wherein the step of exposing the activatable material occurs in an automotive e-coat or painting operation and the activating of the activatable material includes foaming and curing of the activatable material.

14. A method as in claim 12 wherein the activatable material includes a blowing agent.

15. A method as in claim 12 wherein the thermoplastic polyether includes a polymer backbone and includes aromatic ether/amine repeating units in the backbone.

16. A method as in claim 12 further comprising, forming the thermoplastic polyether by reacting a difunctional amine with a glycidyl ether.

17. A method as in claim 12 wherein the thermoplastic polyether is a copolymer of monoethanolamine and diglycidyl ether.

18. A method as in claim 12 wherein the thermoplastic polyether is formed by reacting an amine with an average functionality of 2 or less with a glycidyl ether.

19. A method as in claim 12 wherein the activatable material is substantially tack free.

20. A method of sealing, baffling or reinforcing a portion of an automotive vehicle, the method comprising:

providing an activatable material, the activatable material including:
  i) 30% to about 80% by weight epoxy resin;
  ii) 5% to about 25% by weight thermoplastic polyether selected from a polyetheramine and a polyamino ether;
  iii) a curing agent; and
  iv) a blowing agent;

locating the activatable material within a cavity or upon a surface of a structure of the automotive vehicle; and exposing the activatable material to heat in an automotive e-coat or paint operation thereby activating the activatable material to foam, cure and bond to surfaces of the structure;

wherein the thermoplastic polyether is formed by reacting an amine with an average functionality of 2 or less with a glycidyl ether; and wherein the thermoplastic polyether has a melt index between about 25 and about 75 per 10 minutes under load of 2.16 Kg at a temperature of about 190° C.

21. A method as in claim 20 wherein the thermoplastic polyether is a copolymer of monoethanolamine and diglycidyl ether.

22. A method as in claim 21 wherein the blowing agent is selected from an azodicarbonamide, a dinitrosopentamethylenetetramine, a 4,4,-oxy-bis-(benzenesulphonylhydrazide), a trihydrazinotriazine and a N,N,-dimethyl-N,N,-dinitrosoterephthalamide.

23. A method as in claim 22 wherein the activatable material includes an ingredient selected from a filler, a clay, a blowing agent accelerator, a curing agent accelerator, and a flexiblizer.

24. A method as in claim 23 wherein the activatable material further includes a polymeric material selected from an elastomer-containing adduct, a halogenated polymer, a polycarbonate, a polyketone, a urethane, a polyester, a silane, a sulfone, an allyl, an olefin, a styrene, an acrylate, a silicone, a phenolic, a polyphenylene oxide, a terphthalate and an acetate.

25. A method as in claim 24 wherein locating of the activatable material within a cavity or upon a surface of a structure of the automotive vehicle includes applying the activatable material to a carrier and inserting the carrier and the activatable material into the cavity of the structure of the automotive vehicle.

26. A method as in claim 24 wherein locating the activatable material includes extruding the activatable material onto the surface of the carrier member.

27. A method as in claim 26 wherein the activatable material is substantially tack free.

* * * * *

UNITED STATES PATENT AND TRADEMARK OFFICE
CERTIFICATE OF CORRECTION

| | | |
|---|---|---|
| PATENT NO. | : 7,125,461 B2 | Page 1 of 1 |
| APPLICATION NO. | : 10/430993 | |
| DATED | : October 24, 2006 | |
| INVENTOR(S) | : Michael J. Czaplicki et al. | |

It is certified that error appears in the above-identified patent and that said Letters Patent is hereby corrected as shown below:

Column 16, Line 1, replace "24" with --25--.

Column 16, Line 4, replace "26" with --24--.

Signed and Sealed this

Seventeenth Day of April, 2007

JON W. DUDAS
*Director of the United States Patent and Trademark Office*